(12) United States Patent  (10) Patent No.: US 8,006,433 B1
Bryanton  (45) Date of Patent: Aug. 30, 2011

(54) PLANT SUPPORTS

(75) Inventor: Eunice W. Bryanton, Longmont, CO (US)

(73) Assignee: Garden Magic, LLLP., Logmont, CO (US)

( * ) Notice: Subject to any disclaimer, the term of this patent is extended or adjusted under 35 U.S.C. 154(b) by 0 days.

(21) Appl. No.: 12/692,818

(22) Filed: Jan. 25, 2010

Related U.S. Application Data

(60) Provisional application No. 61/147,391, filed on Jan. 26, 2009.

(51) Int. Cl.
    *A01G 17/06* (2006.01)
(52) U.S. Cl. .......................................................... 47/45
(58) Field of Classification Search ................. 47/44–47
    See application file for complete search history.

(56) References Cited

U.S. PATENT DOCUMENTS

| D22,206 | S | * | 2/1893 | Smith ................................ D8/1 |
| 601,691 | A | * | 4/1898 | Watson ........................ 47/32.4 |
| 871,901 | A | * | 11/1907 | Walton .............................. 47/47 |
| 1,359,388 | A | * | 11/1920 | Koerner ........................... 47/47 |
| 1,556,373 | A | | 8/1923 | Thoeni |
| 1,560,404 | A | * | 11/1925 | Brown ............................. 47/47 |
| 1,594,195 | A | * | 7/1926 | Henderson ........................ 47/47 |
| 1,932,790 | A | * | 10/1933 | Lein ................................. 47/47 |
| 2,530,015 | A | | 3/1948 | Kouri |
| 2,618,902 | A | | 11/1952 | Prescott |
| 2,906,062 | A | | 11/1956 | Hohenfeldt |
| 3,105,327 | A | * | 10/1963 | Gasper ............................. 47/47 |
| 3,803,759 | A | * | 4/1974 | Heinecke ......................... 47/47 |
| 4,322,911 | A | | 4/1982 | Bach |
| 4,841,670 | A | * | 6/1989 | Bitter ............................... 47/47 |
| 4,899,967 | A | * | 2/1990 | Johnson ......................... 248/97 |
| 5,048,231 | A | * | 9/1991 | Brown ............................. 47/45 |
| 5,557,883 | A | | 9/1996 | Walker |
| D378,149 | S | * | 2/1997 | Mann .......................... D30/133 |
| 5,640,802 | A | * | 6/1997 | Elliott .............................. 47/45 |
| 6,067,751 | A | * | 5/2000 | Payr ................................. 47/70 |
| 6,209,258 | B1 | | 4/2001 | Schneider |
| 6,405,479 | B1 | | 6/2002 | Sherman |
| 6,964,126 | B1 | | 11/2005 | Anderson |
| 7,188,448 | B2 | | 3/2007 | Sedlacek |
| 7,249,439 | B2 | | 7/2007 | Pierce, Jr. |

(Continued)

FOREIGN PATENT DOCUMENTS

DE 3523772 A1 * 1/1987

(Continued)

*Primary Examiner* — Rob Swiatek
*Assistant Examiner* — Kristen Hayes
(74) *Attorney, Agent, or Firm* — Rick Martin; Patent Law Offices of Rick Martin, P.C.

(57) ABSTRACT

A gardening plant support can be a plastic semi-circular base which can face another base to form a circle on the ground or in a flower pot. At the end of each base may be a removable spike to allow shipping in a flat box. When in use the spikes are pressed into the ground. Then wires are pushed through holes in the base to reinforce the footing on the ground. The wires protrude upward one to four feet to allow clipping plant stalks thereto. A straight head version can have eight or more wires and a central spike.

13 Claims, 3 Drawing Sheets

U.S. PATENT DOCUMENTS

| | | |
|---|---|---|
| 7,281,352 B2 | 10/2007 | Peck |
| 7,774,977 B2 * | 8/2010 | Miller Shelton ............... 47/45 |
| 7,810,276 B2 * | 10/2010 | Rosaen ............................ 47/33 |
| 7,874,100 B2 * | 1/2011 | Miller ............................. 47/46 |
| 7,905,053 B2 * | 3/2011 | Lisciotti et al. ................ 47/47 |
| 2008/0028677 A1 * | 2/2008 | Shelton .......................... 47/46 |
| 2011/0047871 A1 * | 3/2011 | Bowerman ..................... 47/44 |

FOREIGN PATENT DOCUMENTS

| | | |
|---|---|---|
| EP | 21962 A1 * | 1/1981 |
| FR | 2919463 | 2/2009 |
| GB | 2115262 A * | 9/1983 |

* cited by examiner

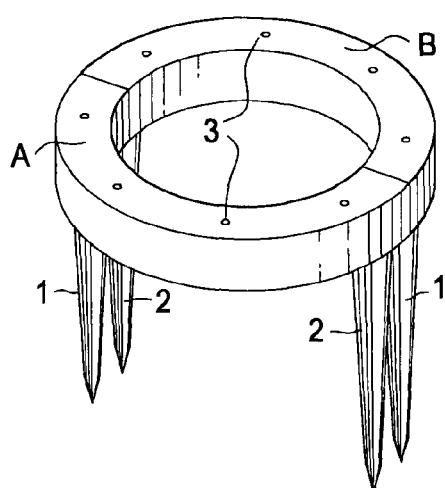
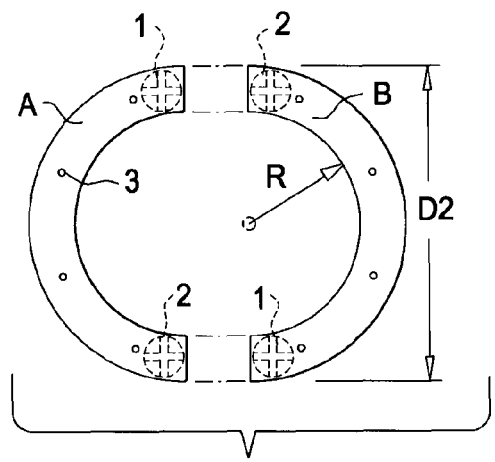
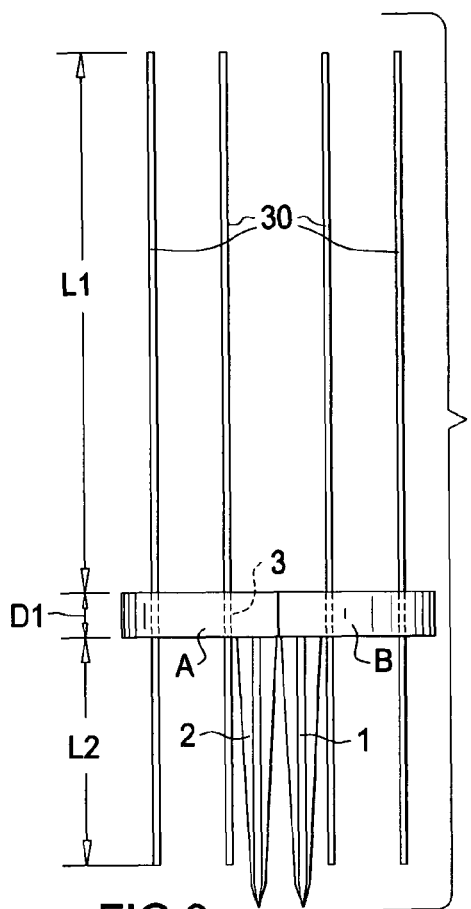
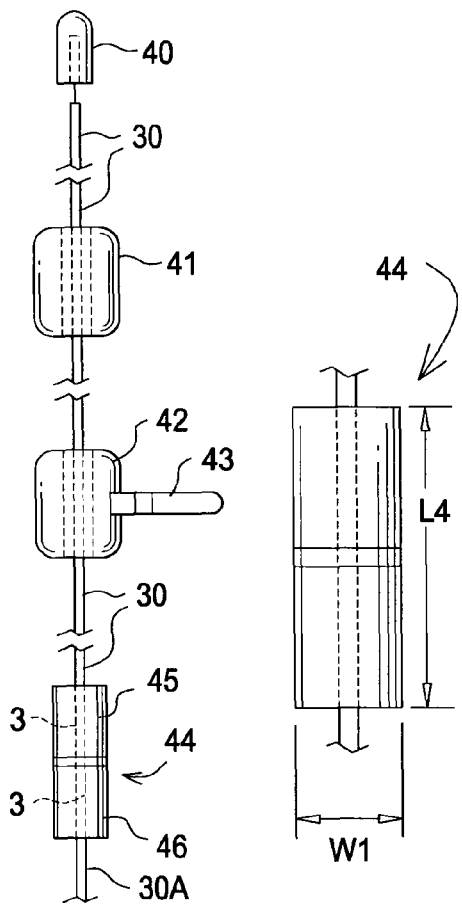

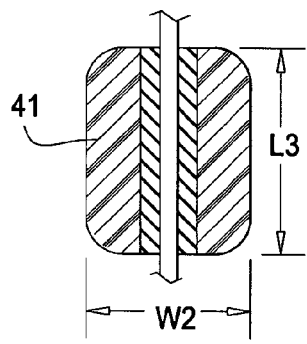
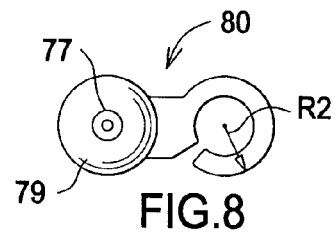
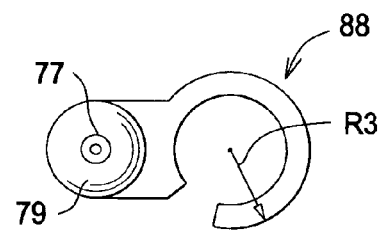
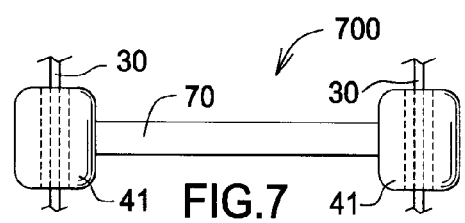
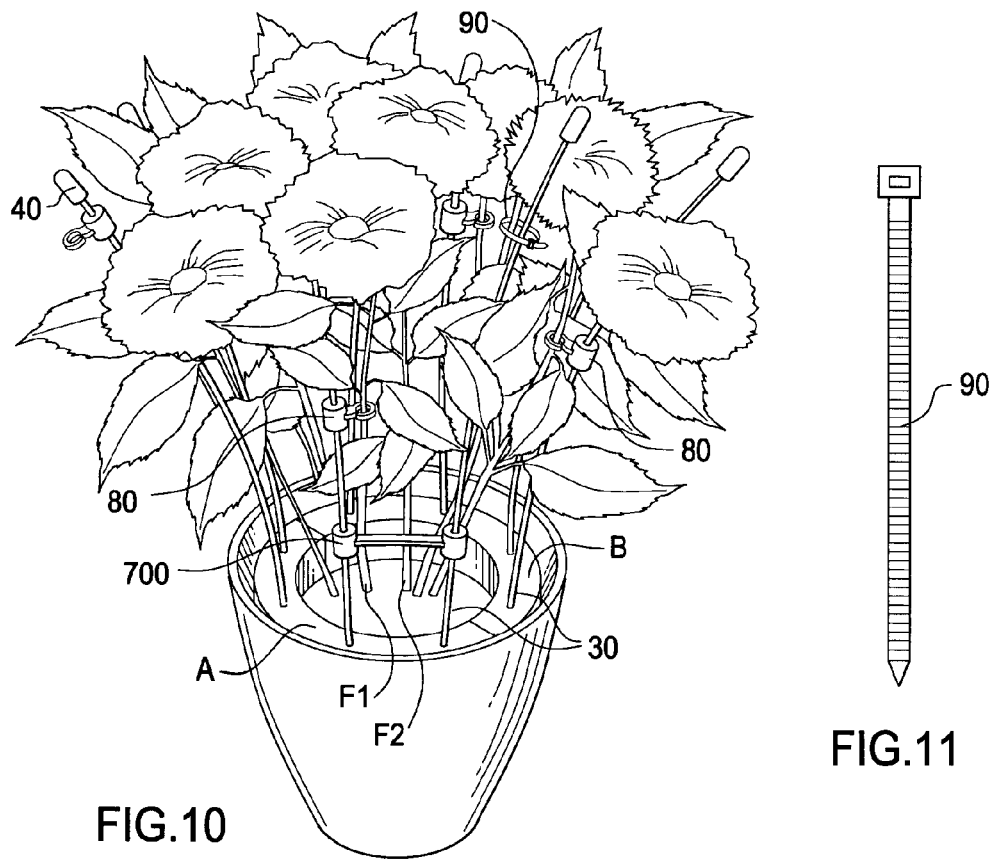

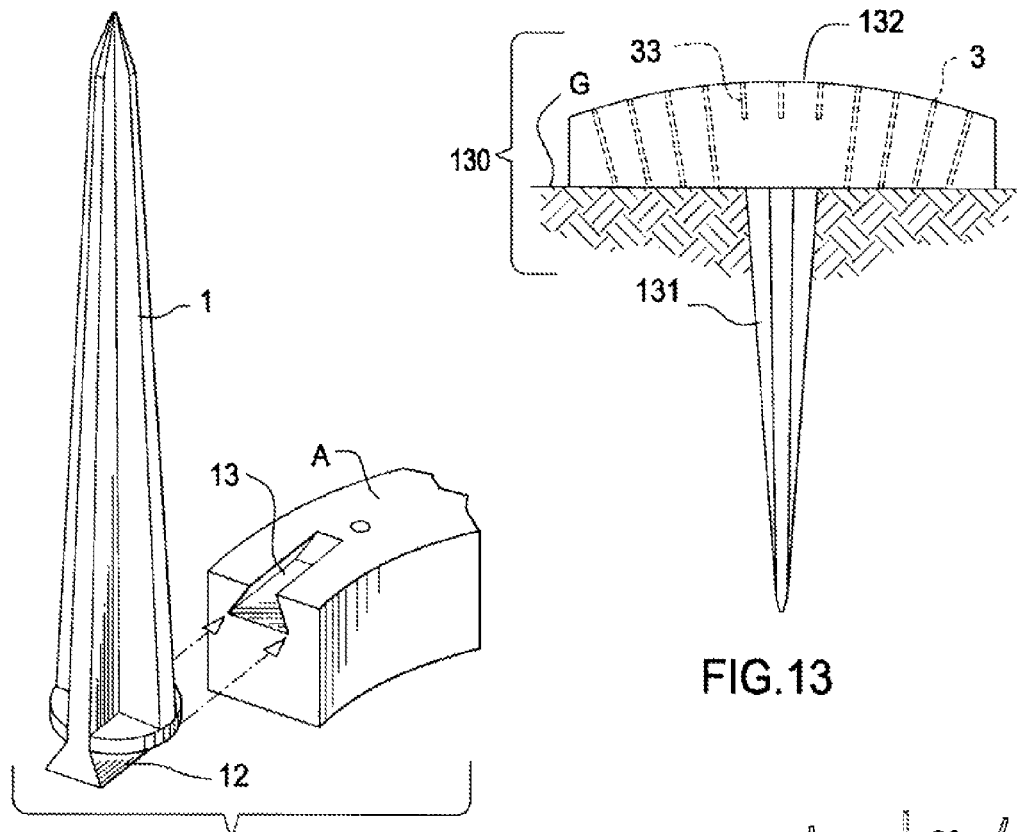
FIG.12
FIG.13
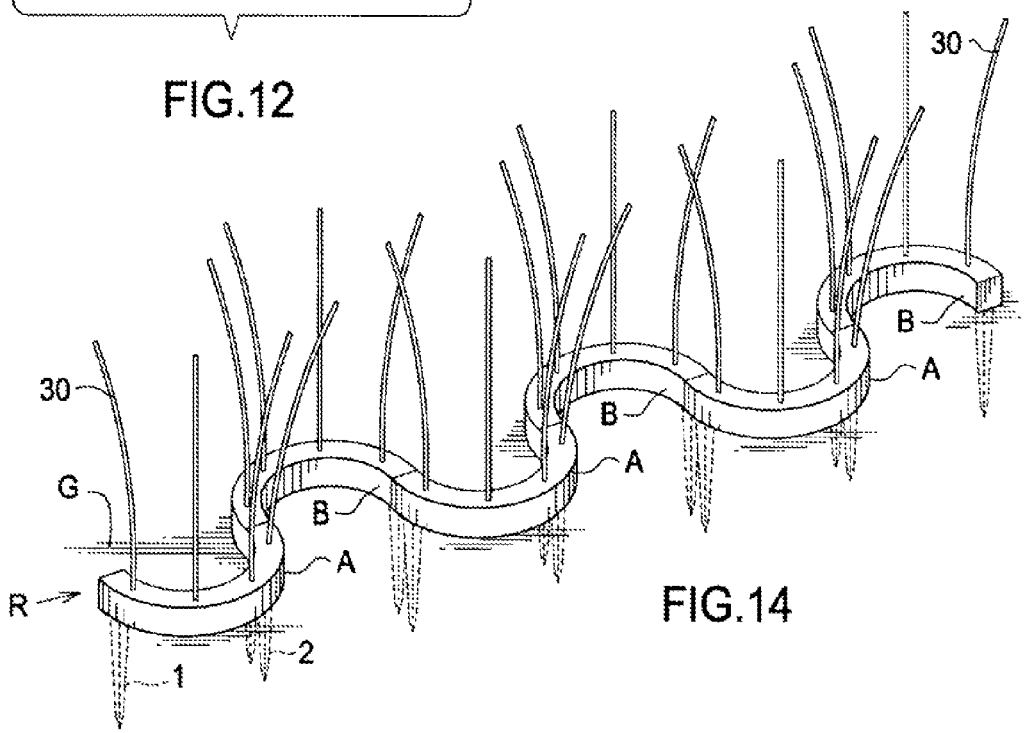
FIG.14

PLANT SUPPORTS

CROSS REFERENCE APPLICATIONS

This application is a non-provisional application claiming the benefits of provisional application No. 61/147,391 filed Jan. 26, 2009.

FIELD OF INVENTION

The present invention relates to providing a plastic base with ground spikes around a plant stalk. A plurality of bendable wires extend upward from the base. Clips are used to secure the plant stalk to the wires.

BACKGROUND OF THE INVENTION

A summary of related art follows below:

U.S. Pat. No. 1,556,373 (1925) to Thoeni discloses a plant support with a ground stake, a hub (15) and outward extending spokes. The spokes support a circular ring having notches (17) to support stalks of plants. No plastic hooks are taught.

U.S. Pat. No. 2,530,015 (1950) to Kouri discloses a trellis. A spike(s) supports horizontal supports that form enclosed rectangles into which grow a stalk. The spikes extend upward to support a sun shade. No plastic hooks are taught.

U.S. Pat. No. 2,618,902 (1952) to Prescott discloses a plant support with a stake into which two, three or four metal rods (14) are inserted. A hub consists of an elastic collar. Each rod has a circlet (16) which is a clip which holds the stalk. These clips replace the need for a plastic hook. The rods could be bent up. No circular halves are taught.

U.S. Pat. No. 2,906,062 (1959) to Hohenfeldt discloses a wooden or plastic trellis. Zigzag flexible strips support a vine.

U.S. Pat. No. 5,557,883 (1996) to Walker discloses a raisin trellis. Upward metal rods support wires on which the vines can grow. The trellis is not designed to support flowering plant stalks.

U.S. Pat. No. 6,209,258 (2001) to Schneider discloses a potted plant support having a vertical rod fastened to the bottom of the pot. A collar(s) has a stalk support loop, and it adjusts up/down the rod. String ties (38) tie the stalk to the rod.

U.S. Pat. No. 6,405,479 (2002) to Sherman discloses a trellis wire support clip.

U.S. Pat. No. 6,964,126 (2005) to Anderson discloses a tree support system.

U.S. Pat. No. 4,322,911 (1982) to Back discloses a vine trellis/plant support (tomatoes etc.) that uses a circular hub (24). The hub supports vertical wires (11) that are connected into a cylindrical cage like shape.

Additionally chicken wire fencing has long been used to support plants. But short stubs of chicken wire tend to give way as the plant grows and gains weight.

What is needed in the art is a support base that resists falling over when weighted, the base having a plurality of bendable wires onto which plant stalks can be fastened.

The present invention provides both a straight base and a semi-circular base, each with vertical wires to which deep stalks can be fastened.

The present invention provides both a straight base and a semi circular base, each with deep stakes for support. Holes in the base allow wires to be pushed into the ground for added support. The wires protrude upward to provide support to plant stalks.

SUMMARY OF THE INVENTION

The main aspect of the present invention is to provide a base with a stake(s) to be pushed several inches into the earth.

Another aspect of the present invention is to provide a plurality of holes in the base into which a wire may be inserted so as to also penetrate the earth for support.

Another aspect of the present invention is to provide a a length to the wires high enough to support a plant stalk.

Another aspect of the present invention is to provide semi-circular bases which can be formed into a circle in a flower pot. These may or may not have stakes.

Other aspects of this invention will appear from the following description and appended claims, reference being made to the accompanying drawings forming a part of this specification wherein like reference characters designate corresponding parts in the several views.

The semi circular embodiment can be formed into a serpentine line along a border or larger expanded circles and shapes as desired for a border. Alternatively two halves can form a circle in a flower pot. Since flower pots slant inward, stakes may not be used. Eight wires can be pushed into the pot to provide about a foot tall array of supports for the plant. Any assortment of wire ties, clips and fasteners can support the plant to the wires. In gardens these supports can be extended to form a support several feet in height for tomato plants.

BRIEF DESCRIPTION OF THE DRAWINGS

FIG. 1 is a top perspective view of two semi circular bases forming a circle.

FIG. 2 is a top plan view of FIG. 1 embodiment.

FIG. 3 is a side elevation view of the FIG. 1 embodiment with wires installed.

FIG. 4 is a side elevation view of various fixtures for a wire.

FIG. 5 is a side elevation view of a joint.

FIG. 6 is a cross sectional view of a clip.

FIG. 7 is a side elevation view of a reinforcement clasp.

FIG. 8 is a top plan view of a clip.

FIG. 9 is a top plan view of a larger clip.

FIG. 10 is a front perspective view of the FIG. 1 embodiment in use.

FIG. 11 is a side elevation view of a wire tie.

FIG. 12 is a front perspective view of a spike being connected to a semi-circular base.

FIG. 13 is a side elevation view of a straight base embodiment.

FIG. 14 is a top perspective view of a serpentine row of semi-circular bases.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE DRAWINGS

In FIGS. 1-3 two semi-circular bases A, B are positioned to form a circle. Each base A, B has a spike at 1, 2 at each distal end. Holes 3 are preferably but not necessarily formed all the way thru base A, B to allow wires 30 to be pushed below a ground surface G several inches for added support to the ground. Nominal dimensions could be D1=1", L2=6", L1=40", Radius=2.5", D2=7". Holes 3 could be 1/16" rod holes. Wires 30 are preferably metal and easily bent by a gardener to conform to plant stalks. The size of the bases can conform to flower pots or be made larger for gardens growing tomato plants and the like.

In order to provide a flat package FIG. 13 shows how each spike 1, 2 can be mounted via tongue 12 into groove 13 of the base A.

FIGS. 4, 5 show attachments for the wires 30. Protective tip 40 can be plastic. Reinforcement clasp collar 41 sides on wire 30 to a chosen height. Plant clip 43 is supported by collar 42. Joint 44 has upper half 45 to hold wire 30. Lower half 46 supports wire 30A. Nominal length L4=2 1/8', W1=1/4".

Referring next to FIGS. 6, 7 reinforcement clasp 700 consists of two collars 41 joined by bridge 70, all preferably made of plastic. Nominal dimensions are L3=1.5", W2=1.25".

Referring next to FIGS. 8, 9 clips 80, 88 each have a collar 79. Nominal dimensions are R2=3/8", R3=5/8". Rubber core 77 provides traction to secure the collar 79 in one place.

Referring next to FIGS. 10, 11 the flower pot 100 (nominally 7" diameter) is growing a flower with several stalks F1, F2 etc. Several clips 80 support the stalks against the wires 30. Wire ties 90 can also be used. These bases A, B do not have stakes because they would interfere with the sloping sides of the flower pot. The thru holes 3 may be angled to prevent hitting the flower pot with the wires 30.

Referring next to FIG. 13 the support 130 has a convex head 132 supported by a spike 131 which could be a foot long for gardening use. Wires 30 fit thru holes 3. Holes 33 cannot go thru head 131 due to the spike 131.

The same attachments shown in FIGS. 4,5,6,7,8,9,11 can be used with support 130. If two wires 30 are joined to make a four foot tall wire, then reinforcement clasps 700 can secure the tips as needed.

In FIG. 14 several semi-circular bases A, B are placed in a serpentine row R at ground level G. These bases A, B would have stakes. The spikes 1, 2 are underground. Wires 30 can support a hedge or a row of flowers.

All embodiments can be made in leaf green color to blend with the plant. The wires 30 can be vinyl coated. By design choice some of the thru holes may not go all the way thru the base.

Although the present invention has been described with reference to preferred embodiments, numerous modifications and variations can be made and still the result will come within the scope of the invention. No limitation with respect to the specific embodiments disclosed herein is intended or should be inferred. Each apparatus embodiment described herein has numerous equivalents.

I claim:

1. A plant support apparatus comprising:
a semi-circular base having a removable spike at each of a first and a second end thereof;
said removable spike extending several inches below the semi-circular base to secure the semi-circular base on a ground surface and prevent it from falling over;
a plurality of thru holes spaced about and within the semi-circular base and parallel to the removable spikes;
a first wire adjustably engaged in at least one of said thru holes to protrude below and above the semi-circular base;
said wire suited to be pushed into the ground surface for added support; and
a clip on the wire above the semi-circular base functioning to support a plant.

2. The apparatus of claim 1, wherein the clip further comprises a collar adjustably engaged on the wire.

3. The apparatus of claim 1, wherein said first wire is connected to a second wire via a reinforcement clasp.

4. The apparatus of claim 1, wherein said semi-circular base further comprises a height of one inch.

5. A plant support apparatus comprising:
a first and second semi-circular base each having a removable spike at each of a first and a second end thereof;
each of said removeable spikes extending several inches below the semi-circular bases to secure its respective semi-circular base on a round surface and prevent it from falling over;
each semi-circular base having a plurality of spaced holes parallel to the removeable spikes;
a first wire in each semi-circular base adjustably engaged in one of said holes to protrude above and below the semi-circular base;
said first wire suited to be pushed into the ground surface for added support; and
wherein the first semi-circular base is placed facing the second semi-circular base to form a circle.

6. The apparatus of claim 5, wherein the first wire has a clip to engage a plant stem.

7. The apparatus of claim 5, wherein said first wire is connected to a second wire by a reinforcement clasp.

8. The apparatus of claim 5, wherein the first wire is joined to an extension wire with a joint thereby increasing its height.

9. The apparatus of claim 5, wherein said semi-circular base further comprises a height of one inch.

10. A plant support apparatus for a flower pot, the plant support apparatus comprising:
a first and second semi-circular base;
each base having a plurality of spaced thru holes angled perpendicular to a top surface of the base;
a wire adjustably engaged in at least one thru hole in each base to protrude below and above the base;
each of said wires extending into a flower pot soil surface to prevent its respective base from falling over when weighted;
wherein the first base is placed facing the second base to form a circle atop the flower pot soil surface in the flower pot; and
wherein each wire has a clip to engage a plant stem.

11. The apparatus of claim 10, wherein at least one wire and an adjacent wire are connected by a reinforcement clasp.

12. The apparatus of claim 10, wherein at least one wire is joined to an extension wire with a joint thereby extending its height.

13. The apparatus of claim 10, wherein said semi-circular base further comprises a height of one inch.

* * * * *